W. A. HUNTER.
STORM TOP FOR BUGGIES.
APPLICATION FILED MAR. 21, 1910.
983,371.
Patented Feb. 7, 1911.
2 SHEETS—SHEET 1.
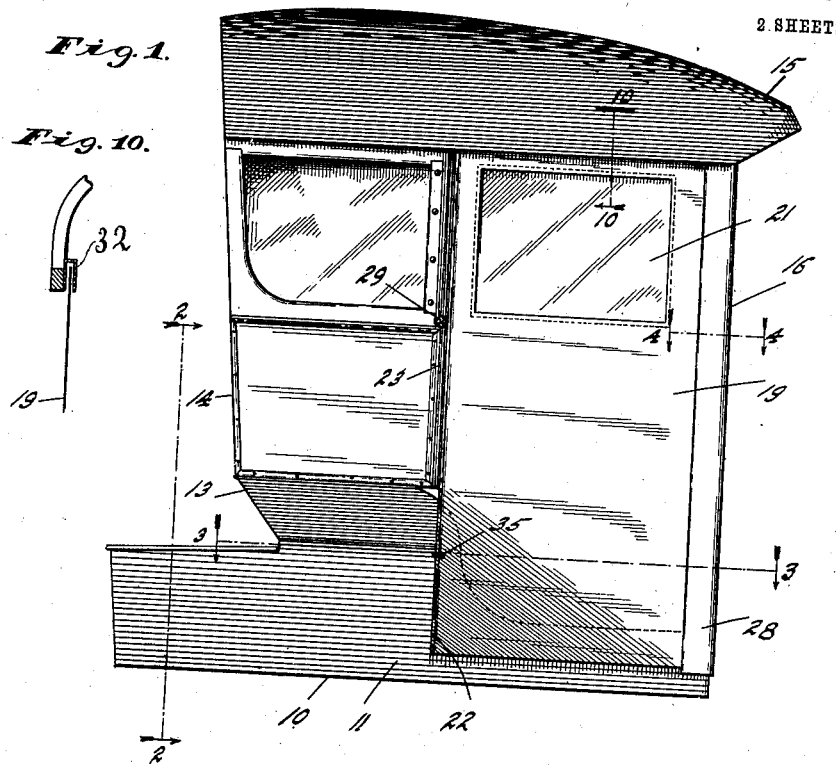
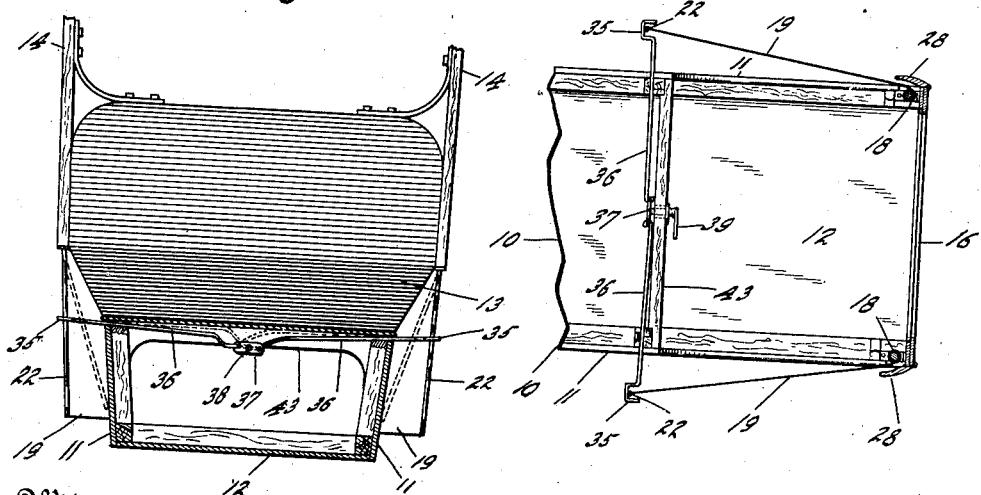
Witnesses
Frank A. Fahle
Thomas W. McMeans
Inventor
William A. Hunter,
By Bradford Hood
Attorneys W. A. HUNTER.
STORM TOP FOR BUGGIES.
APPLICATION FILED MAR. 21, 1910.
983,371.
Patented Feb. 7, 1911.
2 SHEETS—SHEET 2.
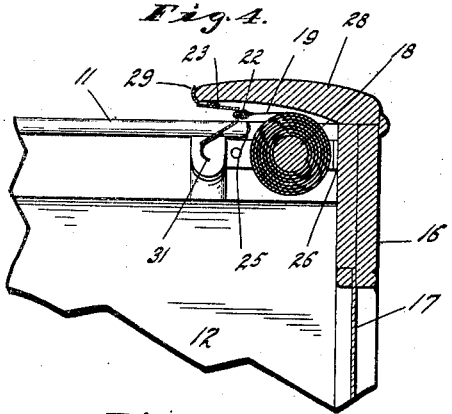
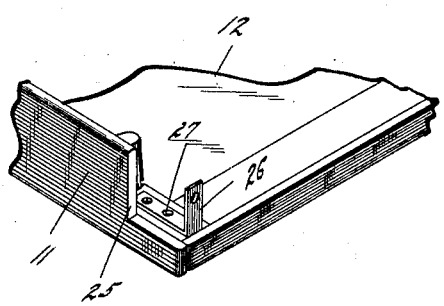
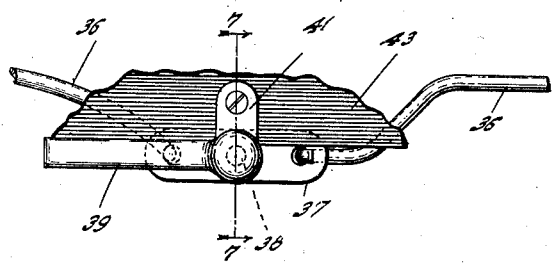
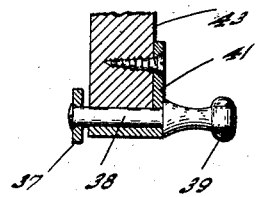
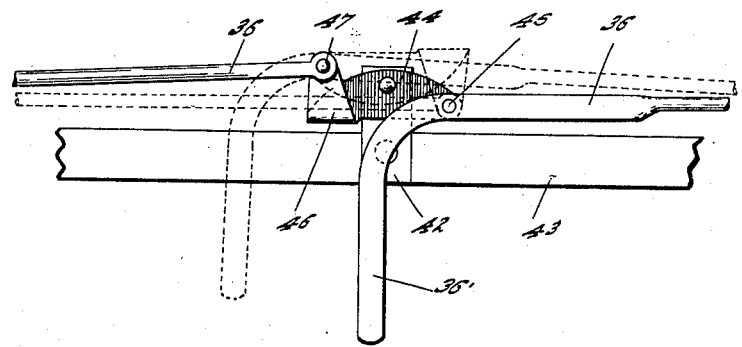
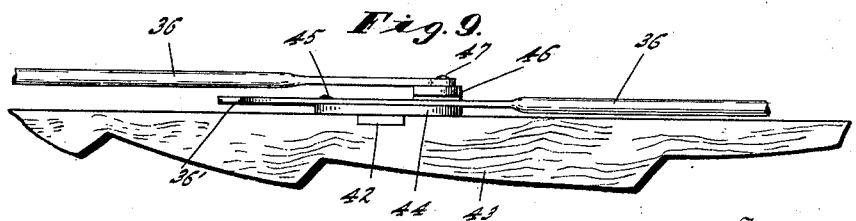
Witnesses
Frank A. Fahl
Thomas W. McMeans
Inventor
William A. Hunter,
By Bradford & Hood
Attorneys

UNITED STATES PATENT OFFICE.

WILLIAM A. HUNTER, OF TERRE HAUTE, INDIANA.

STORM-TOP FOR BUGGIES.

983,371.  Specification of Letters Patent.  Patented Feb. 7, 1911.

Application filed March 21, 1910. Serial No. 550,682.

*To all whom it may concern:*

Be it known that I, WILLIAM A. HUNTER, a citizen of the United States, residing at Terre Haute, in the county of Vigo and State of Indiana, have invented a new and useful Storm-Top for Buggies, of which the following is a specification.

The object of my invention is to provide improvements in storm tops for vehicles wherein vertically arranged roller curtains may be so intimately associated with the cover structure and main vehicle body, when in closed position, as to give thorough and complete protection to the occupant against both wind and rain.

In the accompanying drawings which illustrate my invention; Figure 1 is a side elevation of my improved structure with the storm curtain extended; Fig. 2 a fragmentary vertical section on line 2—2 in Fig. 1; Fig. 3 a fragmentary horizontal section on line 3—3 in Fig. 1; Fig. 4 an enlarged horizontal section on line 4—4 in Fig. 1; Fig. 5 a perspective detail of the forward end of the main body of the vehicle; Fig. 6 an elevation of a portion of the curtain-deflecting mechanism; Fig. 7 a section on line 7—7 of Fig. 6; Fig. 8 a plan of a modified form of curtain-deflecting mechanism; Fig. 9 an elevation of the part shown in Fig. 8, and Fig. 10 a section on line 10—10 of Fig. 1.

In the drawings, 10 indicates the main box or body of the vehicle, having the side panels 11 and floor 12. The ordinary "piano-box" body has the side panels 11 continued around the front end of the box, and the seat 13 is considerably wider than the main body of the box, as clearly indicated in Fig. 2.

Secured to the upper edge of the seat 13 of the main body, are two side frames 14, 14 which, at their upper ends, are connected to the lower rear corners of the top 15, which extends forwardly over the forward end of the main body 10. The rear edges of the sides 14 are connected by a curtain, or other suitable inclosure, in a well-known manner. At the forward end of top 15, and preferably under the forward end thereof, so that the joint will be protected thereby, is the upper end of a front wall 16 provided with a suitable transparent panel 17. Journaled on a substantially vertical axis at each vertical edge of the front wall 16 is a spring-retracted curtain roller 18 carrying a flexible curtain 19 which may be provided, if desired, with a transparent flexible panel 21. The free end of the curtain 19 is stiffened by a flexible rod 22 and secured to this free end of the curtain at the upper part thereof, is a channel 23, the arms of which are adapted to straddle the forward edge of a side 14 toward the rear, so as to thus thoroughly protect the joint between the curtain and the side 14 against wind and rain as the vehicle moves forward.

Thus far the construction is very similar to the construction forming the subject matter of my previous Patent No. 810,150. Such devices, however, have been open to the objection that, because of the vertical arrangement of the storm curtains, the lower end of the front wall 16 needed to be enough wider at the front end of the body 10 to permit the lower ends of the curtain rollers to lie outside of the forward ends of the side panels of the main body and, consequently, when the curtain was drawn backward to closing position, the lower edge of the curtain would not only lie a considerable distance from the side panel where the free edge of the curtain was laterally displaced in order to engage with the front edge of side 14, but would also lie a considerable distance from the forward end of the side panels of the main body.

My present structure is primarily designed to overcome the above mentioned difficulty and for that purpose I either remove or omit the front panel from the main body 10 and also remove or omit a short portion of the front end of each side panel 11, as indicated at 25, providing a bracket 26 to which the lower edge of the front wall 16 may be detachably secured. This bracket 26 may also be provided with a bearing 27 adapted to receive the lower pintle of the curtain roller 18. By this arrangement the curtain roller 18 lies inside of the outer face of the side panel 11 so that the curtain 19, as it is drawn rearwardly from the roller, immediately adjacent the roller, will lie closely against the forward end of the side panel 11. Secured to each vertical edge of the front wall 16 is a rearwardly projecting flange or strip 28, the rear edge of which considerably overlaps the forward end of side panel 11, lying a distance therefrom merely enough to allow free passage of the curtain 19.

Channel 23 will engage the rear edge of flange 28 so as to limit the retraction of the curtain, and the inner leg of the channel will be provided with a finger hook 31 by means of which the operator may grasp the channel so as to draw the curtain to closing position.

The upper edge of the curtain 19 is mounted within a depending guide flange 32 which leads to the forward edge of a side 14, and consequently the free end of the curtain, when drawn to the position shown in Fig. 1, will be carried away from the sides of the main body 10 a considerable distance, owing to the fact that the seat is wider than the main body, as clearly shown in Fig. 2. This causes the lower edge of the curtain to lie a considerable distance from the side of the vehicle body, as clearly indicated in Figs. 2 and 3, and in practice it is found that wind and rain are very apt to be driven upward into the inclosure through the space thus left open. In order to avoid this difficulty I provide two hooks 35, 35 which are projected from opposite sides of the main body and normally lie in position to receive the free ends of the curtains when the same are drawn to closing position. The channels 23 extend from the top of the curtain downwardly to the lower ends of sides 14, and the flexible stiffening rods 22 extend from the lower ends of the channels 23 downwardly to the lower edges of the curtains. I therefore place the hooks 35 at a point about midway between the lower ends of channels 23 and the lower edges of the curtains so that, by drawing the hooks inwardly toward each other, the free ends of the curtains at their lower corners will be drawn inwardly, as indicated by dotted lines in Fig. 2, so as to thus bring the lower edges of the curtains closely against the outer faces of the side panels of the main body 10 throughout the entire length of the curtains and thus prevent the entrance of blasts of wind and rain beneath the lower edges of the curtains.

In order to readily move the hooks 35 from outer to inner position and vice versa, each hook 35 is carried by a rod 36 which is extended through a suitable perforation formed in the side wall of the main box of the body, with the inner ends connected in such a manner that they will be readily simultaneously operated. In Figs. 2, 3, 6 and 7 this conection comprises a connecting lever 37, to which the inner ends of rods 36 are pivoted, a shaft 38 to which lever 37 is secured, and an operating arm 39 secured to the outer end of shaft 38. Shaft 38 is journaled in a suitable bracket 41 secured immediately beneath the seat so as to be readily accessible by the occupant of the vehicle. It will be readily understood that a half turn of the shaft 39 will cause a movement of the hooks 35 from one position to the other.

In Figs. 8 and 9 I show a somewhat simpler construction wherein a plate 42, mounted upon the wall 43 beneath the seat, carries a pivoted plate 44 to which is pivoted, at 45, one of the rods 36. At its other end plate 44 is provided with a laterally displaced and transversely extended lip 46 to which is pivoted, at 47, the other rod 36. The first mentioned rod 36 is provided with a forwardly extending finger 36'. The tongue 46 is laterally displaced enough so that, when the parts are shifted to the positions indicated in dotted lines in Fig. 8, the said tongue will overlap the other rod 36. It will be noticed that, by this arrangement, a pull upon the extension 36', in the line of its rod 36, will cause a rocking movement of plate 44, the two pivots 45 and 47 lying one above and the other below the horizontal line of the pivot of plate 44.

In practice the lower end of the front wall 16 does not need to be any wider than the front end of the main body of the vehicle so that the structure presents a much neater appearance than it has been possible to attain with similar structures heretofore placed on the market. When the occupant desires to close the space between the front wall 16 and front edges of the side walls 14, he will grasp the finger hooks 31 of the curtains and draw them to the rear, fastening the channels 23 to the front edges of the sides 14 in any desired manner. This operation will automatically bring the lower parts of the free ends of the curtains into hooks 35, whereupon, by proper manipulation of the connection between rods 36, the said hooks 35 will be brought inwardly toward the body of the vehicle, from the position shown in Fig. 3 to the positions indicated in dotted lines in Fig. 2, thereby drawing the lower edges of the curtains closely against the sides of the vehicle throughout the entire length of the curtains. It will be noticed that, by this arrangement, it is not only possible to arrange the lower edges of the curtains outside of the main body of the vehicle, thus forming a perfect water-shed between each curtain and the vehicle body, but that it is also possible to so intimately associate the lower edges of the curtains with the sides of the main body as to form a practically wind and rain-proof joint, thus thoroughly protecting the occupant.

I claim as my invention—

1. The combination, with a vehicle body, of a top structure, a vertically arranged roller curtain, means for supporting the free end of said curtain in a position laterally extended beyond the main body of the vehicle, and means for engaging the free end of the curtain near its lower edge and deflecting the same from its general trend toward the main body of the vehicle.

2. The combination, with a vehicle body, of a top structure associated therewith having depending sides and a depending front wall separated from the forward edges of the depending sides, a pair of vertically arranged roller curtains journaled one at each edge of the depending front wall and so arranged that the lower edge of each curtain may lie outside the side walls of the main body of the vehicle, means for associating the free end of each curtain at its upper side with the forward edge of a side wall of the top structure, and means for engaging the lower portion of the free end of each curtain and deflecting the same inwardly toward the main body of the vehicle.

3. The combination, with a vehicle body, of a top structure associated therewith having depending sides and a depending front wall separated from the forward edges of the depending sides, a pair of vertically arranged roller curtains journaled one at each edge of the depending front wall and so arranged that the lower edge of each curtain may lie outside the side walls of the main body of the vehicle, means for associating the free end of each curtain at its upper side with the forward edge of a side wall of the top structure, a laterally flexible stiffening member for that portion of the curtain below the side wall of the top structure, and means for engaging the lower portion of the free end of each curtain and deflecting the same inwardly toward the main body of the vehicle.

4. The combination, with the main body of a vehicle having a curtain passage at each forward corner, of a front wall structure arranged at the forward end of said main body in front of said curtain passages, roller curtains journaled upon substantially vertical axes one at each side of the front wall and within the side walls of the main body, the free ends of the curtains being extensible through said curtain passages to outside the side walls of the main body, a pair of side walls extending upwardly to the rear of the front wall, a top extending over the said side walls to the front wall.

5. The combination, with the main body of a vehicle having a curtain passage at each forward corner, of a front wall structure arranged at the forward end of said main body in front of said curtain passages, roller curtains journaled upon substantially vertical axes one at each side of the front wall, the free ends of the curtains being extensible through said curtain passages to outside the side walls of the main body, a pair of side walls extending upwardly to the rear of the front wall, a top extending over the said side walls to the front wall, means for associating the upper portions of the free ends of the curtains with the forward edges of the side walls of the top structure, and means for engaging the lower portions of the free ends of the curtains and deflecting the same inwardly toward the main body of the vehicle.

In witness whereof, I have hereunto set my hand and seal at Indianapolis, Indiana, this 16th day of March, A. D. one thousand nine hundred and ten.

WILLIAM A. HUNTER. [L. S.]

Witnesses:
ARTHUR M. HOOD,
THOMAS W. MCMEANS.